(12) United States Patent
Dielhof et al.

(10) Patent No.: US 6,584,238 B1
(45) Date of Patent: Jun. 24, 2003

(54) DYNAMIC RANGE MODIFICATION

(75) Inventors: Pieter B. Dielhof, Eindhoven (NL); Ralph M. W. Van Der Heijden, Posterholt (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/545,783

(22) Filed: Apr. 7, 2000

Related U.S. Application Data

(63) Continuation of application No. 09/198,042, filed on Nov. 23, 1998.

(30) Foreign Application Priority Data

Nov. 27, 1997 (EP) .............................................. 97203715

(51) Int. Cl.⁷ ................................................ G06K 7/00
(52) U.S. Cl. ...................................... 382/312; 348/687
(58) Field of Search ................................. 358/500, 514, 358/530, 448, 443; 348/678, 645, 646, 649, 651, 687, 712; 382/162, 312

(56) References Cited

U.S. PATENT DOCUMENTS

| | | | |
|---|---|---|---|
| 4,926,247 A | * 5/1990 | Nagasaki et al. | 358/43 |
| 5,138,458 A | * 8/1992 | Nagasaki | 358/209 |
| 5,638,138 A | * 6/1997 | Hickman | 348/678 |
| 5,815,291 A | * 9/1998 | Shono et al. | 358/504 |
| 5,963,665 A | * 10/1999 | Kim et al. | 382/169 |
| 6,384,937 B1 | * 5/2002 | Matama | 358/1.9 |

FOREIGN PATENT DOCUMENTS

| JP | 404342371 | * 11/1992 | ............ H04N/1/40 |

OTHER PUBLICATIONS

"Adaptive Highlight Compression in Today's CCD Cameras", H. Blom et al, SMPTE Journal, Mar. 1992, pp. 135–139.

"The All–Digital Camcorder—The Arrival of Electronic Cinematography", Laurence J. Thorpe and A. Takeuchi, SMPTE Journal, Jan. 1996, pp. 13–30.

"New Signal–Processing LSIS for the 8MM Camcorder" Makota Onga et al, IEEE Transactions on Consumer Electronics, vol. 36, No. 3, Aug. 1990, pp. 494–501.

"False Color Signal Reduction Method for Single–Chip Color Video Cameras", Hiroaki Sugiura et al, IEEE Transactions on Consumer Electronics, vol. 40, No. 2, May 1994, pp. 100–106.

"Adaptive Gamma Processing of the Video Cameras for the Expansion of the Dynamic Range", Sigeo Sakaue et al, IEEE Transactions on Consumer Electronics, vol. 41, No. 3, Aug. 1995, p. 555–561.

* cited by examiner

*Primary Examiner*—Jerome Grant, II
(74) *Attorney, Agent, or Firm*—Michael E. Belk

(57) ABSTRACT

In a dynamic range modification (DRCS), a brightness component (B) is selected (LPF) from a sensor output signal (SS), the brightness component (B) is non-linearly processed (NLP) to provide a non-linearly processed brightness signal (B'), and a modified signal (CS) is furnished (GC2) in dependence upon the non-linearly processed brightness signal (B').

32 Claims, 2 Drawing Sheets

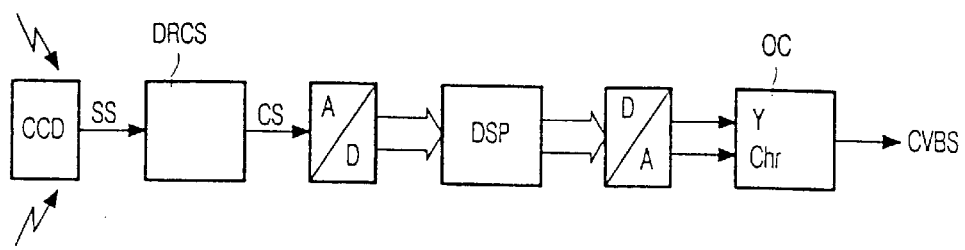
FIG. 1
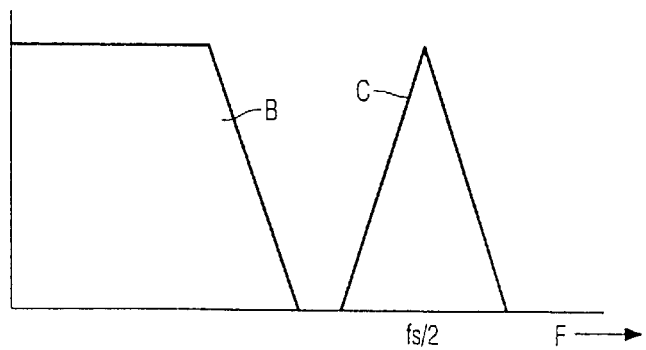
FIG. 2
FIG. 3

DYNAMIC RANGE MODIFICATION

CROSS REFERENCE TO RELATED APPLICATIONS

This is a continuation of application Ser. No. 09/198,042, filed Nov. 23, 1998.

The invention relates to a dynamic range modification and to a camera comprising such a dynamic range modification. The notion modification includes compression and expansion.

The article "Adaptive highlight compression in today's CCD cameras", SMPTE Journal, March 1992, pp. 135–139, discloses an adaptive variable knee proposal to make the best use of the increased dynamic range of current CCD sensors, as displays (typically having a maximum dynamic range of 40 dB) cannot deal with the large dynamic range (being over 75 dB) of CCD sensors. The same knee characteristic is active in all three color channels (R, G, B).

The article "The all-digital camcorder—the arrival of electronic cinematography", SMPTE Journal, January 1996, pp. 13–30, discloses a digital processing circuit having a gamma/knee circuit for each of the three digitized color channels R, G, B. Several circuits, including an A/D converter and a matrix circuit, are located between each of the three CCD sensors (one for each color) and the gamma/knee circuit.

It is, inter alia, an object of the invention to provide a simpler modification, especially one that is suitable for use with a single CCD color camera. To this end, a first aspect of the invention provides a dynamic range modification as defined in claims 1 and 6. A second aspect of the invention provides a camera comprising such a dynamic range modification. Advantageous embodiments are defined in the dependent claims.

In a dynamic range modification in accordance with a primary aspect of the present invention, a brightness component is selected from a sensor output signal, the brightness component is non-linearly processed to provide a non-linearly processed brightness signal, and a modified signal is furnished in dependence upon the non-linearly processed brightness signal.

Preferably, in the sensor output signal, after the sample & hold operation, a non-linear processing operation (compression, expansion or histogram egalization) is carried out on the brightness component, while a linear brightness-level-dependent gain correction is carried out on the color component.

The invention is based on the following recognitions. Especially in security cameras there is a need for rendering details visible under circumstances where the illumination of a scene may cause large contrast problems. Also in consumer cameras there is a need for such a dynamic range modification. While in a 3-CCD camera three brightness signals are available for R, G, and B, respectively, the sensor signal from a camera having only one CCD sensor contains both brightness and color information. A non-linear processing operation on the latter signal would result in intolerable errors in the color information. For this reason, brightness and color information in the sensor output signal are currently first transformed into Y, R, G, B signals, to which Y, R, G, B signals compression is applied. To bring an overload margin of, for example, 600% back within the range of the system, all signal processing circuits preceding the dynamic range compression should be linear up to at least 600%. In general, this demand cannot be met by standard analog processing ICs. For digital ICs, this requirement implies an input accuracy of over 13 bits. This is feasible for studio cameras, but for consumer and security cameras such a high accuracy is very costly and not available in compact form. In most cases, the dynamic range modification will be a dynamic range compression. However, for example in misty conditions, it might be necessary to carry out a dynamic range expansion rather than a dynamic range compression to obtain a good contrast.

The invention is based on the recognition that it is possible to apply a dynamic range modification on the output signal of a CCD sensor having a color filter by reducing high amplitudes only for those signals which primarily include a brightness component. So, the A/D conversion circuit and the matrix circuit receive an already modified signal which renders it possible to use cheaper circuits than if the modification took place after the A/D conversion circuit and the matrix circuit like in the prior art. The color filter may, for example, be a Bayer filter or a complementary mosaic filter.

This separate processing of the brightness and color components in a sensor output signal is based on the recognition that this is possible because these components occupy different places in the frequency domain, as will now be explained. The surface of a CCD sensor can be interpreted as a sensitive layer having a window structure, each window representing a pixel. The pixel information is read with a clock frequency which is high enough to read all pixels on a row within one TV line period. Consequently, the output signal of a CCD sensor has a frequency spectrum in which the brightness information is present at baseband and around all harmonics m*fs of the sample frequency fs. The color information results from a color filter on the sensor surface, alternate pixels being covered by alternate colors. With two alternating colors in the horizontal read-out direction, a repeating frequency spectrum with a frequency offset of half (m*fs/2) the pixel read-out frequency is obtained at the output.

So, if the sensor signal passes a low-pass filter, a representation of the brightness information is available.

These and other aspects of the invention will be apparent from and elucidated with reference to the embodiments described hereinafter.

In the drawings:

FIG. 1 shows a block diagram of a camera in accordance with the present invention;

FIG. 2 shows an example of a color filter for use with a CCD sensor in the camera of FIG. 1;

FIG. 3 shows the brightness and color information locations in the frequency spectrum of the sensor output signal where the sensor is applied with an appropriate optical low-pass filter;

In the block diagram of FIG. 1, a CCD sensor receives light from a scene and furnishes a sensor signal SS to a dynamic range modification (compression, expansion or histogram egalization) circuit DRCS. Embodiments of suitable dynamic range modification circuits DRCS are shown in FIGS. 4–7. The dynamic range modification circuit DRCS furnishes a modified (compressed) signal CS to an A/D converter, whose output is connected to a digital signal processor DSP. An output of the digital signal processor DSP is applied to a D/A converter which furnishes a luminance signal Y and a chrominance signal Chr to an output circuit OC. The output circuit OC produces an output composite video signal CVBS. Preferably, the dynamic range modification is carried out after a correlated double sampling operation to remove disturbance components. The block DRCS may further carry out other pre-processing operations which are irrelevant to the present invention. As mentioned above, instead of a compression, an expansion may be carried out.

FIG. 2 shows a color filter for use on the surface of the CCD sensor of FIG. 2. Ye indicates a yellow pixel, Cy indicates a cyan pixel, Mg indicates a magenta pixel, and G indicates a green pixel. Other complementary mosaic or RGB Bayer color filters are possible.

FIG. 3 illustrates how brightness information B and color information C are distributed in the frequency domain of the sensor signal SS. The frequency fs/2 may be 7 MHz. The two curves B, C may overlap, the brightness curve B having a dip at fs/2.

Figure 4:
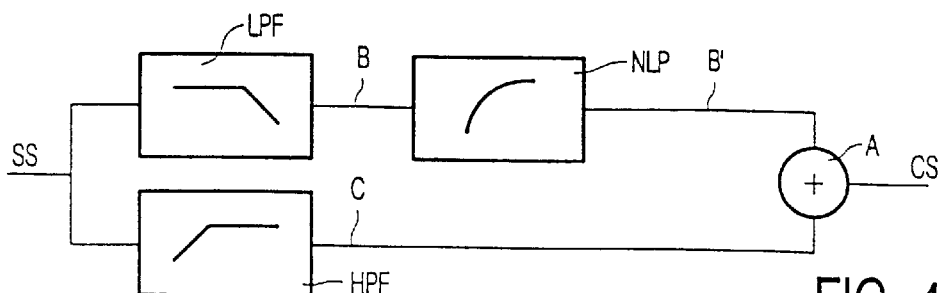
FIG. 4 shows a first embodiment of a dynamic range modification circuit in accordance with the present invention.

FIG. 4 shows a first embodiment of a dynamic range modification circuit in accordance with the present invention. The sensor signal SS is applied to a low-pass filter LPF which selects the brightness component B from the sensor signal SS. The brightness component is subjected to non-linear processing in a processor NLP. A high-pass filter HPF derives the color component C from the sensor signal SS. An adder A adds the non-linearly processed brightness component B' and the color component C to each other to obtain the modified signal CS. FIG. 4 suggests that the modification curve of the non-linear processor NLP is or approximates a circle segment, which indeed yields good results. Of course, more conventional knee modification (compression) curves are also possible, as well as expansion or histogram equalization.

Figure 5:
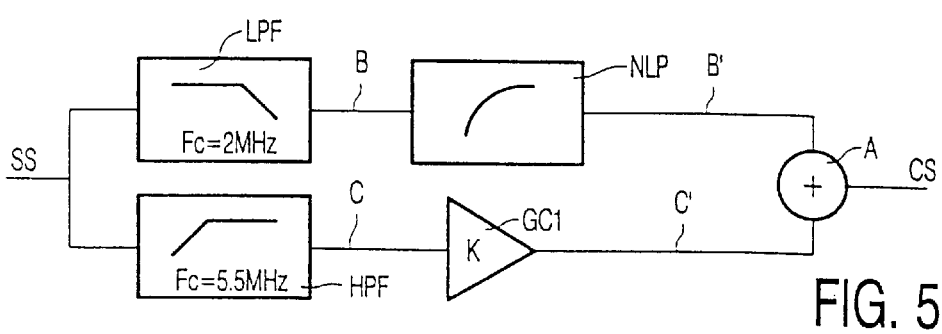
FIG. 5 shows a second embodiment of a dynamic range modification circuit in accordance with the present invention.

FIG. 5 shows a second embodiment of a dynamic range modification circuit in accordance with the present invention. FIG. 5 differs from FIG. 4 in that the color component C is subjected to a gain adjustment by a gain controller GC1 to obtain a gain-adjusted color component (C') which is added to the non-linearly processed brightness component B'. In this manner, flexibility is increased. Typically, gain control factors K vary between 1 and 5. The multiplier could be a multiplying A/D convertor.

Figure 6:
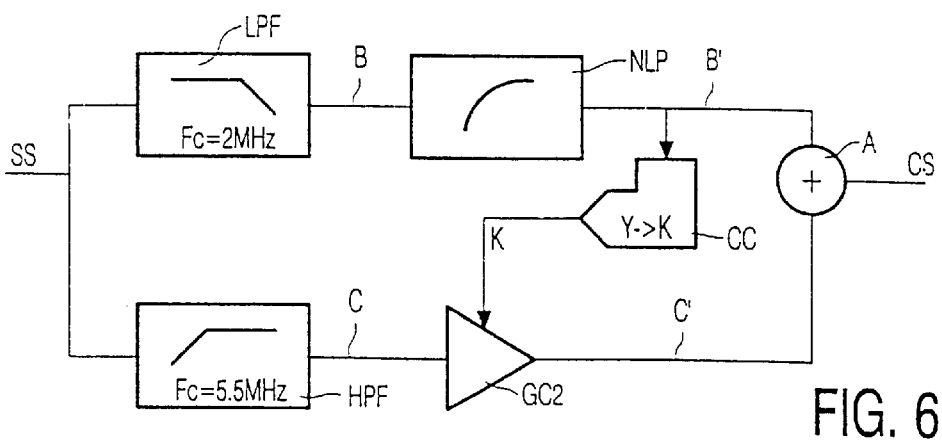
FIG. 6 shows a third embodiment of a dynamic range modification circuit in accordance with the present invention.

FIG. 6 shows a third embodiment of a dynamic range modification circuit in accordance with the present invention. FIG. 6 differs from FIG. 5 in that the gain adjustment by a gain controller GC2 depends on a gain control factor K which is derived by a conversion circuit CC from the non-linearly processed brightness component B'. In this manner it is possible to maintain a constant ratio between the brightness information and the color information. Preferably, the conversion circuit CC is or approximates a divider.

Figure 7:
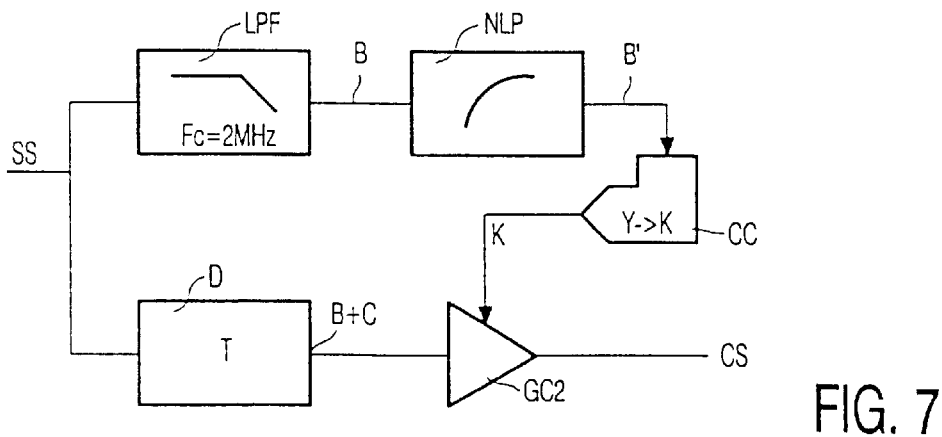
FIG. 7 shows a fourth embodiment of a dynamic range modification circuit in accordance with the present invention.

FIG. 7 shows a fourth embodiment of a dynamic range modification circuit in accordance with the present invention. FIG. 7 differs from FIG. 6 in that the high-pass filter HPF is replaced by a delay circuit D for providing a delay T compensating the processing delay of the circuits LPF, NLP and CC. Moreover, the gain controller GC2 outputs the modified signal CS. So, the non-linearly processed brightness component B' is only used to obtain the gain control factor K. Since the whole sensor signal SS is subjected to the gain control, the brightness component therein is non-linearly processed by means of this gain control, while the color component is modulated by a level-dependent amount. The advantage of not separating the brightness and color informations is that the ratio between these two is always the same.

It should be noted that the above-mentioned embodiments illustrate rather than limit the invention, and that those skilled in the art will be able to design many alternative embodiments without departing from the scope of the appended claims. In the claims, any reference signs placed in parentheses shall not be construed as limiting the claim. The invention can be implemented by means of hardware comprising several distinct elements, and by means of a suitably programmed computer. In a device claim enumerating several means, a number of these means can be embodied in one and the same item of hardware. As to FIGS. 4–6 it is noted that the precise values of the cut-off frequencies of the low-pass filters LPF and the high-pass filters HPF are less relevant than the fact that they are to some extent complementary. Preferably, the low-pass filters LPF have a zero at fs/2 while the high-pass filters HPF have a zero at 0.

What is claimed is:

1. A dynamic range modification circuit comprising:
   an input for an analog sensor signal containing analog brightness and analog color components;
   analog means for providing the analog brightness component from the analog sensor signal;
   means for non-linearly processing the brightness component to provide a non-linearly processed brightness signal; and
   output means for furnishing a modified signal depending on the non-linearly processed brightness signal and the analog color component.

2. The circuit of claim 1, wherein the output means include:
   means for generating a gain control signal from the non-linearly processed brightness signal; and
   means for multiplying the sensor signal by the gain control signal to obtain the modified signal.

3. The circuit of claim 1, wherein the output means comprise:
   means for generating a gain control signal from the non-linearly processed brightness signal;
   analog means for providing a color component from the sensor output signal;
   means for multiplying the color component by the gain control signal to obtain a gain-adjusted color component; and
   means for summing the non-linearly processed brightness signal and the gain adjusted color component to obtain the modified signal.

4. The circuit of claim 1, wherein:
   the brightness component is provided from the sensor signal through a high pass frequency filter;
   the color component is provided from the sensor signal through a low pass frequency filter;
   the circuit further comprises:
      means for digitizing the modified signal to obtain digital signals; and
      means for further processing the digital signals.

5. A color camera, comprising:
a sensor for generating an analog sensor signal containing analog brightness and analog color components;
analog means for providing the analog brightness component from the analog sensor signal;
means for non-linearly processing the brightness component to provide a non-linearly processed brightness signal;
output means for furnishing a modified signal depending on the non-linearly processed brightness signal and the analog color component; and
means for further processing the modified signal.

6. The camera of claim 5, wherein the further processing means include:
means for digitizing the modified signal to obtain digital signals; and
means for further processing the digital signals.

7. The camera of claim 5 wherein the brightness component is provided from the sensor signal through a high pass frequency filter.

8. The camera of claim 5 wherein the color component is provided from the sensor signal through a low pass frequency filter.

9. The camera of claim 5, wherein the output means include:
means for generating a gain control signal from the non-linearly processed brightness signal; and
means for multiplying the sensor signal by the gain control signal to obtain the modified signal.

10. The camera of claim 5, wherein the output means include:
means for generating a gain control signal from the non-linearly processed brightness signal;
analog means for providing a color component from the sensor output signal;
means for multiplying the color component by the gain control signal to obtain a gain-adjusted color component; and
means for summing the non-linearly processed brightness signal and the gain adjusted color component to obtain the modified signal.

11. A dynamic range modification method comprising the steps of:
providing an analog sensor signal containing analog brightness and analog color components;
analog processing to provide the analog brightness component from the analog sensor signal;
non-linearly processing the brightness component to provide a non-linearly processed brightness signal; and
furnishing a modified signal depending on the non-linearly processed brightness signal.

12. The method 11, wherein:
the brightness component is provided from the sensor signal through a high pass frequency filter;
the color component is provided from the sensor signal through a low pass frequency filter; and
the method further comprises the steps of:
digitizing the modified signal to obtain digital signals; and
processing the digital signals.

13. The method of claim 12, wherein furnishing the modified signal includes:
generating a gain control signal from the non-linearly processed brightness signal; and
multiplying the sensor signal by the gain control signal to obtain the modified signal.

14. The method of claim 12, wherein furnishing the modified signal includes:
generating a gain control signal from the non-linearly processed brightness signal;
analog providing a color component from the sensor output signal;
means for multiplying the color component by the gain control signal to obtain a gain-adjusted color component; and
means for summing the non-linearly processed brightness signal and the gain adjusted color component to obtain the modified signal.

15. A dynamic range modification circuit comprising:
an input for an analog sensor signal containing analog brightness and analog color components;
a filter to provide the analog brightness component from the analog sensor signal;
means for non-linearly processing the brightness component to provide a non-linearly processed brightness signal; and
output means for furnishing a modified signal depending on the non-linearly processed brightness signal and the analog color component.

16. The circuit of claim 15, wherein:
the brightness component is provided from the sensor signal through a high pass frequency filter;
the color component is provided from the sensor signal through a low pass frequency filter; and
the circuit further comprises:
means for digitizing the modified signal to obtain digital signals; and
means for further processing the digital signals.

17. The circuit of claim 16, wherein the output means include:
means for generating a gain control signal from the non-linearly processed brightness signal; and
means for multiplying the sensor signal by the gain control signal to obtain the modified signal.

18. The circuit of claim 16, wherein the output means comprise:
means for generating a gain control signal from the non-linearly processed brightness signal;
analog means for providing a color component from the sensor output signal;
means for multiplying the color component by the gain control signal to obtain a gain-adjusted color component; and
means for summing the non-linearly processed brightness signal and the gain adjusted color component to obtain the modified signal.

19. A color camera, comprising:
a sensor for generating an analog sensor signal containing analog brightness and analog color components;
a filter for providing the analog brightness component from the analog sensor signal;
means for non-linearly processing the brightness component to provide a non-linearly processed brightness signal; and
output means for furnishing a modified signal depending on the non-linearly processed brightness signal and the analog color component; and
means for further processing the modified signal.

20. The camera of claim 19, wherein the brightness component is provided from the sensor signal through a high pass frequency filter;

the color component is provided from the sensor signal through a low pass frequency filter; and the further processing means include:
   means for digitizing the modified signal to obtain digital signals; and
   means for further processing the digital signals.

21. The camera of claim 20, wherein the output means include:

means for generating a gain control signal from the non-linearly processed brightness signal; and means for multiplying the sensor signal by the gain control signal to obtain the modified signal.

22. The camera of claim 20, wherein the output means include:

means for generating a gain control signal from the non-linearly processed brightness signal;

analog means for providing a color component from the sensor output signal;

means for multiplying the color component by the gain control signal to obtain a gain-adjusted color component; and means for summing the non-linearly processed brightness signal and the gain adjusted color component to obtain the modified signal.

23. A dynamic range modification method comprising the steps of:

providing an analog sensor signal containing analog brightness and analog color components;

filtering to provide the analog brightness component from the analog sensor signal;

non-linearly processing the brightness component to provide a non-linearly processed brightness signal; and furnishing a modified signal depending on the non-linearly processed brightness signal.

24. The method of claim 23, wherein:

the brightness component is provided from the sensor signal through a high pass frequency filter;

the color component is provided from the sensor signal through a low pass frequency filter; and the method further comprises the steps of:
   digitizing the modified signal to obtain digital signals; and
   processing the digital signals.

25. The method of claim 24, wherein furnishing the modified signal includes:

generating a gain control signal from the non-linearly processed brightness signal; and multiplying the sensor signal by the gain control signal to obtain the modified signal.

26. The method of claim 24, wherein furnishing the modified signal includes:

generating a gain control signal from the non-linearly processed brightness signal;

filtering to provide a color component from the sensor output signal;

multiplying the color component by the gain control signal to obtain a gain-adjusted color component; and summing the non-linearly processed brightness signal and the gain adjusted color component to obtain the modified signal.

27. A dynamic range modification circuit comprising:

an input for a sensor output signal containing analog brightness and color components;

means for providing the analog brightness component from the sensor signal;

means for non-linearly processing the brightness component to provide an analog non-linearly processed brightness signal; and output means for furnishing a modified signal depending on the non-linearly processed brightness signal and the analog color component;

and wherein the output means include:
   means for generating a gain control signal depending on the non-linearly processed brightness signal; and
   means for multiplying the sensor signal by the gain control signal to obtain a modified signal.

28. A dynamic range modification circuit comprising:

an input for a sensor output signal containing analog brightness and color components;

means for providing the analog brightness component from the sensor signal;

means for non-linearly processing the brightness component to provide an analog non-linearly processed brightness signal; and output means for furnishing a modified signal depending on the non-linearly processed brightness signal and the analog color component;

and wherein the output means include:
   means for generating a gain control signal from the non-linearly processed brightness signal;
   means for providing the color component from the sensor output signal;
   means for multiplying the color component by the gain control signal to obtain a gain-adjusted color component; and
   means for summing the non-linearly processed brightness signal and the gain adjusted color component to obtain the modified signal.

29. A color camera, comprising:

a sensor for generating a sensor output signal containing analog brightness and color components;

means for providing the analog brightness component from the sensor signal;

means for non-linearly processing the brightness component to provide an analog non-linearly processed brightness signal;

output means for furnishing a modified signal depending on the non-linearly processed brightness signal and the color component; and means for further processing the modified signal;

and wherein the brightness component is isolated from the sensor signal using a high pass frequency filter.

30. A color camera, comprising:

a sensor for generating a sensor output signal containing analog brightness and color components;

means for providing the analog brightness component from the sensor signal;

means for non-linearly processing the brightness component to provide an analog non-linearly processed brightness signal;

output means for furnishing a modified signal depending on the non-linearly processed brightness signal and the color component; and means for further processing the modified signal;

and wherein the output means include:
   means for generating a gain control signal from the non-linearly processed brightness signal;
   means for providing the color component from the sensor output signal;
   means for multiplying the color component by the gain control signal to obtain a gain-adjusted color component; and
   means for summing the non-linearly processed brightness signal and the gain adjusted color component to obtain the modified signal;

and wherein the color component is provided from the sensor signal using a low pass frequency filter.

31. A dynamic range modification circuit comprising:

means for providing a brightness component from a sensor output signal;

means for non-linearly processing the brightness component to provide a non-linearly processed brightness signal; and output means for furnishing a modified signal depending on the non-linearly processed brightness signal, including:
   means for generating a gain control signal depending on the non-linearly processed brightness signal; and
   means for multiplying the sensor signal by the gain control signal to obtain the modified signal;

and in which the brightness component is provided from the sensor signal using a high pass frequency filter.

32. A dynamic range modification circuit comprising:

means for providing a brightness component from a sensor output signal;

means for non-linearly processing the brightness component to provide a non-linearly processed brightness signal; and output means for furnishing a modified signal depending on the non-linearly processed brightness signal, including:
   means for generating a gain control signal from the non-linearly processed brightness signal;
   means for selecting a color component from the sensor output signal;
   means for multiplying the color component by the gain control signal to obtain a gain-adjusted color component; and
   means for summing the non-linearly processed brightness signal and the gain adjusted color component to obtain the modified signal;

and in which:
   the brightness component is provided from the sensor signal using a high pass frequency filter;
   the color component is provided from the sensor signal using a low pass frequency filter.

* * * * *